(12) United States Patent
Baksh et al.

(10) Patent No.: US 6,527,831 B2
(45) Date of Patent: Mar. 4, 2003

(54) ARGON PURIFICATION PROCESS (75) Inventors: Mohamed Safdar Allie Baksh, Amherst, NY (US); Alan Barnard Stewart, Snyder, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/750,085

(22) Filed: Dec. 29, 2000

(65) Prior Publication Data

US 2002/0121193 A1 Sep. 5, 2002

(51) Int. Cl.[7] ............................................. B01D 53/053
(52) U.S. Cl. .............................. 95/100; 95/101; 95/102; 95/103; 95/105; 95/130; 95/138; 96/109; 96/130; 96/143
(58) Field of Search ....................... 95/96–98, 100–105, 95/130, 138, 902; 96/109, 115, 130, 143, 144

(56) References Cited

U.S. PATENT DOCUMENTS

| | | | | |
|---|---|---|---|---|
| 4,239,590 A | | 12/1980 | Bligh et al. ..................... 55/66 |
| 4,256,469 A | * | 3/1981 | Leitgeb .......................... 95/96 |
| 4,263,018 A | | 4/1981 | McCombs et al. .............. 55/18 |
| 4,264,339 A | * | 4/1981 | Juntgen et al. ................. 95/96 |
| 4,348,213 A | * | 9/1982 | Armond ....................... 95/103 |
| 4,477,265 A | | 10/1984 | Kumar et al. .................... 55/26 |
| 4,548,799 A | * | 10/1985 | Knoblauch et al. ........... 95/103 |
| 4,576,614 A | * | 3/1986 | Armond et al. ............. 95/96 X |
| 4,781,735 A | * | 11/1988 | Tagawa et al. ................ 95/101 |
| 5,159,816 A | | 11/1992 | Kovak et al. ................... 62/22 |
| 5,176,722 A | * | 1/1993 | Lemcoff et al. ............... 95/102 |
| 5,346,536 A | * | 9/1994 | Kaneshige et al. ............ 95/103 |
| 5,440,884 A | | 8/1995 | Bonaquist et al. .............. 62/22 |
| 5,441,558 A | * | 8/1995 | Lee et al. .................. 95/103 X |
| 5,486,226 A | * | 1/1996 | Ross et al. ................. 95/103 X |
| 5,518,526 A | | 5/1996 | Baksh et al. .................. 95/100 |
| 5,520,720 A | * | 5/1996 | Lemcoff .................... 95/103 X |
| 5,601,634 A | | 2/1997 | Jain et al. ...................... 95/114 |
| 5,704,964 A | * | 1/1998 | Kaneko et al. ........... 95/102 X |
| 5,997,612 A | * | 12/1999 | Doong ...................... 95/102 X |
| 6,113,672 A | * | 9/2000 | Kapoor et al. ............ 95/103 X |

\* cited by examiner

Primary Examiner—Robert H. Spitzer
(74) Attorney, Agent, or Firm—Robert J. Follett (57) ABSTRACT

A pressure swing process and system for purifying a first gas, preferably argon, from a crude feed gas stream containing the first gas and second gas(es) utilizes two adsorption beds and continuously promotes the crude feed gas to the bed during the process and simultaneous equalization of pressure in the two beds in top-to-top end and bottom-to-bottom end equalizations in each bed following purging of each bed.

19 Claims, 5 Drawing Sheets

ARGON PURIFICATION PROCESS

FIELD OF THE INVENTION

This invention relates to an efficient and cost-effective system and process for argon purification, particularly a pressure swing adsorption (PSA) process for argon purification of a feed from a cryogenic air separation plant.

BACKGROUND OF THE INVENTION

In the operation of a cryogenic air separation plant to produce oxygen and nitrogen, there may be recovered a crude argon stream containing about 1–5% by volume oxygen and about 1% by volume nitrogen. To remove oxygen and nitrogen to further purify such crude argon stream, one of the methods generally employed is the reaction of oxygen with excess hydrogen. Such a process is energy intensive, since the gas stream is heated to a high reaction temperature and later cooled to cryogenic temperatures to remove the excess hydrogen and residual nitrogen. In addition, such a process may not be practical in those parts of the world where hydrogen availability and shipment are limited. Another method, based on cryogenic distillation only, requires the use of a large or superstaged argon column due to the small difference in the relative volatility between argon and oxygen. Additional methods include the use of solid electrolyte membrane(s), two beds in series vacuum pressure swing adsorption (VPSA) process, getter/deoxo system, and temperature swing adsorption (TSA).

The cryogenic rectification of air to produce oxygen, nitrogen and/or argon is well known in prior art processes. Typically, a three stage cryogenic process is used, wherein, feed air is separated into nitrogen and oxygen in a double column system that uses nitrogen top vapor from a higher pressure column to reboil oxygen-rich bottom liquid in a lower pressure column, and argon-containing fluid from the lower pressure column is passed into an argon side arm column for the production of argon product. For example, U.S. Pat. No. 5,440,884 by Bonaquist and Lockett, disclosed a three stage cryogenic rectification system, employing a double column system with an associated argon side arm column, to produce high purity (>99.999%) argon. In order to produce high purity argon, a large or superstaged argon column was used. According to U.S. Pat. No. 5,440,884, the large argon column is preferably divided into two separate argon columns, and a stripping column is used upstream of the double main column to suppress the thermodynamic irreversibility of the argon column top condenser and the lower pressure column.

More recently, Jain et al., U.S. Pat. No. 5,601,634 discloses a cryogenic temperature swing adsorption process to produce high purity argon from a two-phase liquid-vapor mixture. According to their invention, each adsorbent bed contains one or more adsorbents selective for nitrogen and/or oxygen at a temperature between the bubble point and the dew point of the two phase mixture. In the most efficient embodiment of that invention, each adsorbent bed contains a nitrogen adsorbent layer that precedes an oxygen adsorbent layer. In addition, according to that invention, the nitrogen selective adsorbent is zeolite type X or mordenite, and the oxygen selective adsorbent layer is carbon molecular sieve or 4A zeolite.

Kovak et al., U.S. Pat. No. 5,159,816, discloses the production of high purity argon (less than 5 ppm each of oxygen and nitrogen) by cryogenic adsorption wherein a crude argon stream flows through a bed of adsorbent that preferentially adsorbs nitrogen, and then through another bed that preferentially adsorbs oxygen. The process is conducted without the need of refrigeration by maintaining a low gas space velocity through the beds, and by limiting the oxygen and nitrogen in the feed (crude argon) to less than 0.8 mole percent and 0.5 mole percent, respectively.

Also, Bligh et al., U.S. Pat. No. 4,239,509, disclosed a low temperature (–250° F.) method for purifying crude argon via temperature swing adsorption (TSA) wherein a feed mixture containing argon, oxygen and nitrogen goes through the steps of reducing the amount of nitrogen to trace level (<0.15% by volume) by passing the crude argon through a first bed of 5A and/or 13X molecular sieves surrounding and in thermal contact with a second bed of 4A zeolite with a wall separating the 5A and/or 13X zeolite from said 4A zeolite, and passing the remaining oxygen and argon, together with residual nitrogen, through the second bed to produce high purity argon. After the adsorption step at –250° F. is completed, nitrogen at 180° F. is used as a purge gas to regenerate the adsorption bed(s).

However, the aforementioned processes suffer from low yield and low purity of the argon product. Another prior art process includes, for example, U.S. Pat. No. 4,477,265 which discloses the adsorption of oxygen and nitrogen from an argon-rich feed taken from the rectification column of a cryogenic air separation plant. According to this patent, argon of high purity is separated and recovered from a crude argon stream containing minor amounts of oxygen and nitrogen, by selective adsorption of these contaminants in a series of adsorption columns (beds). In the preferred embodiment, the system utilizes two separate adsorbent columns in series wherein the first column contains a nitrogen equilibrium selective adsorbent (e.g. zeolite) that is used for nitrogen removal, and the second bed contains an oxygen rate selective adsorbent (e.g. carbon molecular sieve) used for oxygen removal. Further purification of the recovered argon is carried out by catalytic hydrogenation of residual oxygen therein.

Many more variations of the original PSA cycle can be found in the literature. For example, U.S. Pat. No. 5,346,536 by Kaneshige et al., describes PSA processes for $N_2$ production, wherein, top-to-top and bottom-to-bottom bed equalization steps are included in the PSA cycles, and carbon molecular sieve (CMS) is used as the adsorbent. The inclusion of the top-top and bottom-bottom equalization steps in the PSA cycle result in enhanced $N_2$ purity and the minimization of CMS pulverization. In addition, McCombs et al., U.S. Pat No. 4,263,018, proposes the use of uninterrupted feed during bed-bed equalization step(s). For example, according to McCombs et al., uninterrupted feed to the PSA process is conducted simultaneously during the bottom-to-bottom bed equalization step.

All of the aforementioned processes have high capital costs and/or consume a lot of energy. Consequently, there is a need to provide a highly efficient process to recover high purity argon in addition to oxygen and nitrogen from feed air.

SUMMARY OF THE INVENTION

This invention relates to a vacuum pressure swing adsorption (VPSA) process to be used for argon purification to obtain high purity (>99.999%) argon. The VPSA process described herein is for integration with a cryogenic air separation plant wherein crude argon from the cryogenic plant is fed continuously to the VPSA process for argon purification. The integration of the VPSA process with the cryogenic plant has several important advantages over the three stage cryogenic processes that are described for example in U.S. Pat. No. 5,440,884 and references therein, for producing high purity argon. For example, due to the small difference in the relative volatility between argon and oxygen, a large or superstaged argon column is required to produce high purity argon using a three stage cryogenic process. However, by integrating a VPSA process in the cryogenic process to produce high purity (>99.999%) argon, the number of equilibrium stages in the argon side arm column required to get a similar argon recovery is significantly reduced, resulting in a considerable reduction in capital cost associated with superstaging the side arm column to produce high purity argon.

Another advantage of the hybrid VPSA/cryo process is that no post purification is required to obtain high purity argon. For example, in prior art processes using hydrogen deoxo in post purification processes, the impurity (oxygen) contained in the crude argon stream, may be removed by integrating the cryogenic process with the deoxo process. Thus, the oxygen contained in the crude argon stream is allowed to react with excess hydrogen to produce water. Inherent in the use of hydrogen for the deoxygenation process is the contamination of the desired product (argon) with water and the unreacted species (e.g. hydrogen). Consequently, additional purification unit(s) may be required after the deoxygenation process. In addition, since large quantities of hydrogen are typically required for the desired purification, this hydrogen deoxo process could become too costly and obsolete in those parts of the world where hydrogen availability and shipment are limited. Also, note that most of the aforementioned disadvantages also apply to $O_2$ getter deoxo processes.

Another advantage of this new hybrid VPSA/cryo process over prior art hybrid PSA/cryo processes, such as disclosed in U.S. Pat. No. 4,477,265, is the novel steps in the VPSA cycle. For example, the two bed VPSA process of this invention has no feed interruption during bed-to-bed equalization. According to this invention, during the bottom-to-bottom bed equalization step, the bed that is rising in pressure is also receiving feed gas simultaneously. In addition, if nitrogen is present in the crude argon, then the removal of $N_2$ is achieved using a layer of $N_2$ equilibrium selective adsorbent, and a second layer of adsorbent, preferably, an oxygen selective adsorbent such as carbon molecular sieve (CMS), is placed on top of the $N_2$ equilibrium selective adsorbent to perform the argon-oxygen separation. The arrangement of layers of adsorbents in the same vessel for $N_2$ and $O_2$ removal from crude argon differs from the two beds in series as disclosed in U.S Pat. No. 4,477,265. Also, in the preferred mode of operation of this invention, the VPSA process used an oxygen rate selective adsorbent such as CMS to separate an argon-oxygen mixture. In addition, in the preferred mode of operation, the novel cycle of this invention uses countercurrent evacuation before and after the purge step to achieve high purity argon at high yield. Note that in the aforementioned prior art processes, the purging step follows countercurrent evacuation, then pressurization follows the purge step. We have found that evacuating the bed after purging with argon countercurrently results in a bed with lower adsorbed phase loading at the end of evacuation, i.e., lower residual loading on the bed after regeneration, thus, lower adsorbent requirement, and a more efficient process. Also, according to this invention, the two bed VPSA process does not require any storage vessel to store feed gas (crude argon) during bed-to-bed equalization step, thus, lower capital cost. The bed-to-bed equalization step is very important to minimize bed fluidization, CMS pulverization, and to achieve enhanced argon recovery. Since a continuous feed (crude argon) comes from the cryogenic air separation plant, the two bed PSA process is designed to handle a continuous feed during bed-bed equalization. However, in prior art processes, except for U.S. Pat No. 4,263,018, during bed-to-bed equalization, the feed to the PSA process is interrupted, or more than two beds are used, or additional storage tanks are required to handle continuous feed. In addition, although prior art hybrid PSA/cryo processes used oxygen rate selective adsorbents such as 4A zeolite (U.S. Pat. No. 4,239,509) or carbon molecular sieves (U.S. Pat. No. 4,477,265) the novel steps in the PSA column cycle of this invention differ significantly from the prior art processes.

Finally, in the preferred mode of operation of this new VPSA/cryo process, a hydrostatic head pressure could be used to compress the crude argon stream from the cryogenic process to the high pressure required by the VPSA process. Thus, most or all of the energy for feed compression comes from the hydrostatic head pressure. Since the need for a crude argon compressor is eliminated, additional cost reduction is achieved in the production of high purity argon. In addition, the argon usually lost in the waste stream of the VPSA process is substantially recovered by recycling the gas to the cryogenic unit.

BRIEF DESCRIPTION OF THE DRAWINGS

The VPSA process of this invention will be described with reference to the drawings and a particularly preferred embodiment in which.

DETAILED DESCRIPTION OF INVENTION AND PREFERRED EMBODIMENTS

Figure 1:
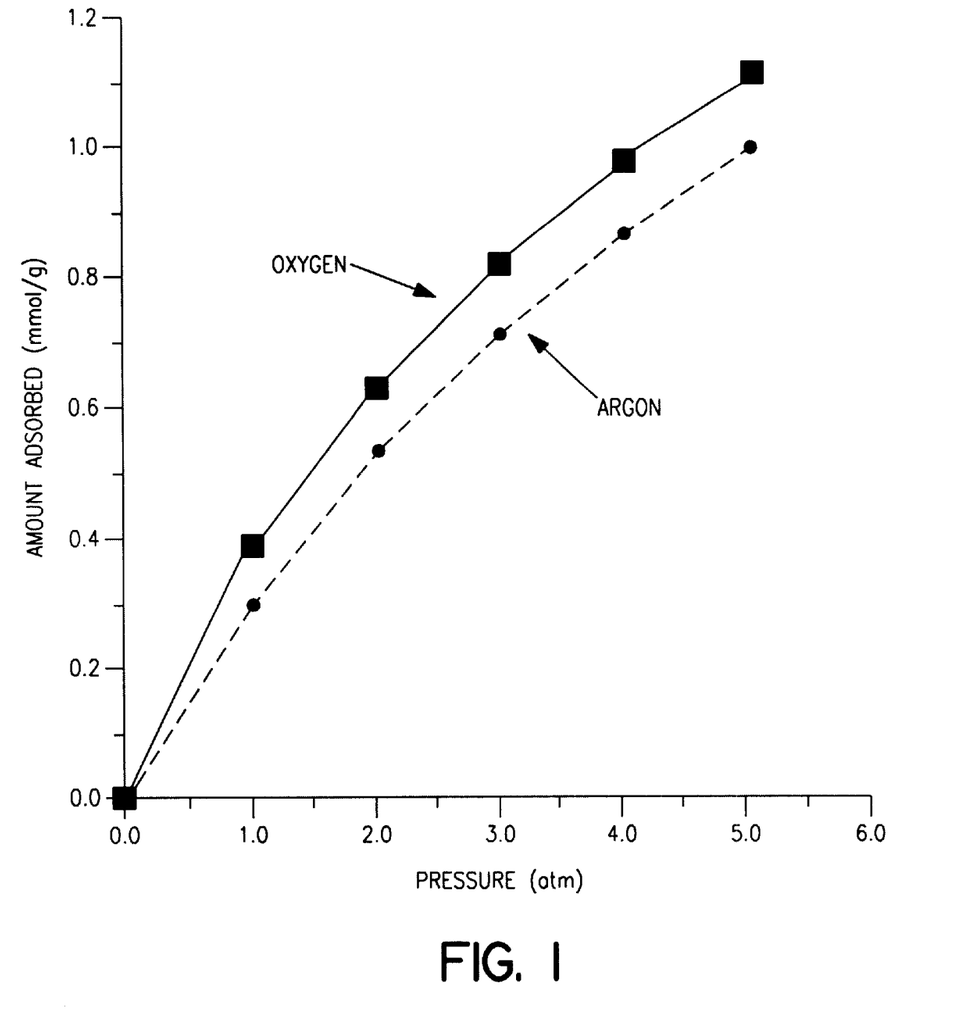
FIG. 1 shows the adsorption isotherms of oxygen and argon on a particular carbon molecular sieve.
Figure 2:
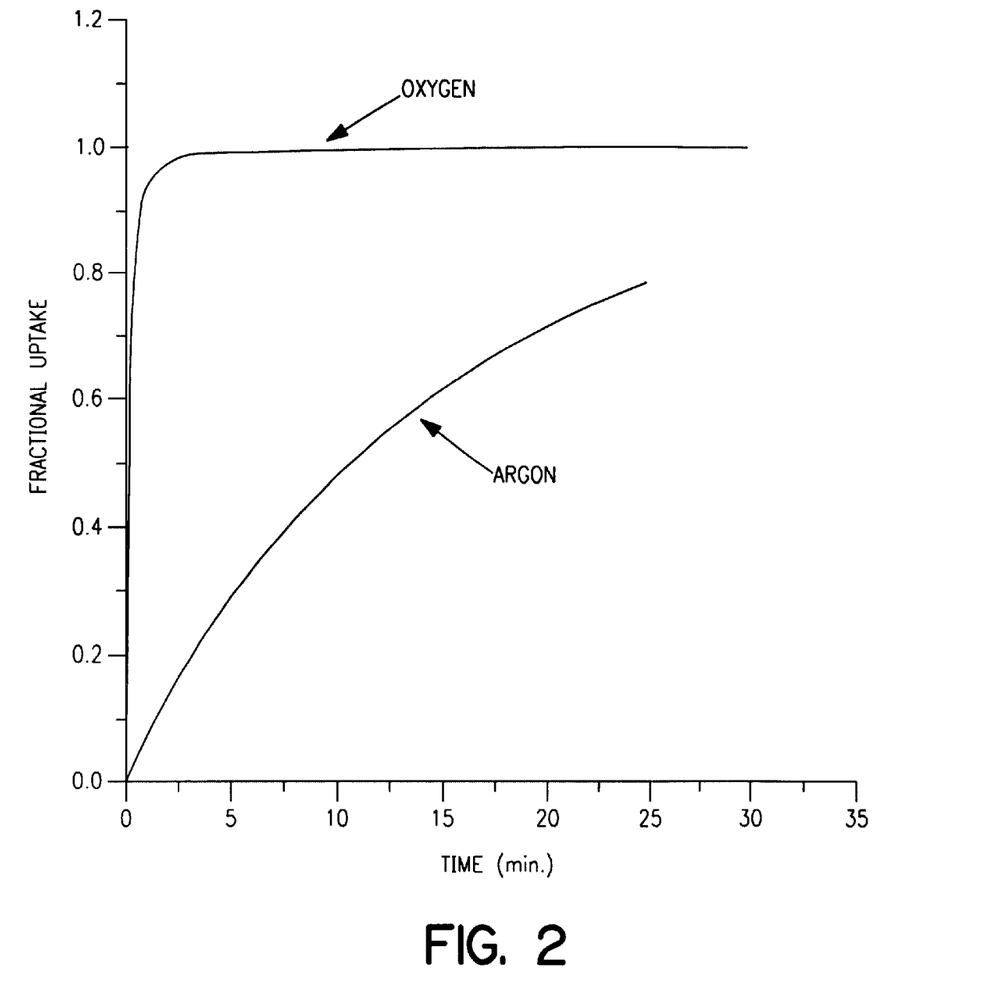
FIG. 2 shows the uptake rates of oxygen and argon on the same carbon molecular sieve.

Note from FIGS. 1 and 2 that the separation of a mixture containing argon and oxygen relies on the faster uptake rate of oxygen over argon, i.e., the kinetic selectivity of $O_2/Ar$. Consequently, it is very important to adjust accurately the process operating conditions and the times for each step in the PSA cycle to obtain an efficient PSA process. For example, if too much time is allocated for feed pressurization, then a significant decrease in the kinetic selectivity of $O_2/Ar$ is observed, thus, a significant decrease in the PSA process performance.

Figure 3:
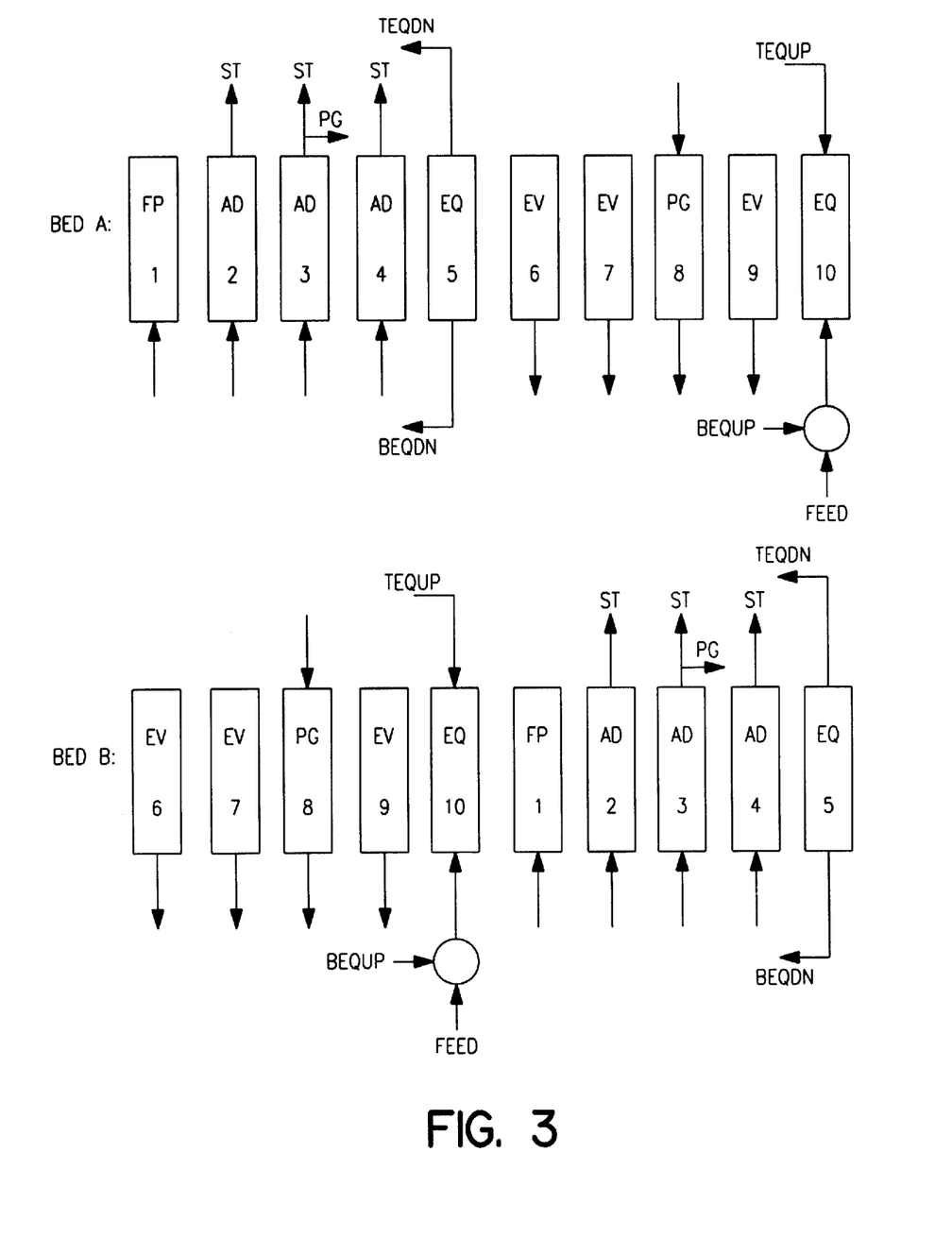
FIG. 3 is a schematic illustration of the VPSA process of this invention.

Referring to FIG. 3, the VPSA process of the invention is illustrated. The VPSA process of this invention goes through the following steps separately or in any combination.

Step 1: Feed (crude argon) pressurization (FP).

Step 2: Constant high pressure adsorption and product make (AD).

Step 3: Continuation of the constant pressure adsorption and product make (AD) while a portion of the product is expanded and used for purging (PG) another bed.

Step 4: Continuation of the constant pressure adsorption and product make (AD).

Step 5: Simultaneous top-to-top bed equalization (Bed A: TEQDN=Top Equalization Down) and bottom-to-bottom bed equalization (Bed A: BEQDN=Bottom Equalization Down) with another bed that is rising in pressure.

Step 6: Counter-current blowdown (BD)/evacuation (EV) prior to the purging step.

Step 7: Continuation of the Counter-current blowdown (BD)/evacuation (EV) prior to the purging step.

Step 8: Countercurrent Purging (PG).

Step 9: Counter-current blowdown (BD)/evacuation (EV) after the purging step.

Step 10: Simultaneous top-to-top bed equalization (Bed A: TEQUP=Top Equalization Up) and bottom-to-bottom equalization (Bed A: BEQUP=Bottom Equalization Up) with another bed that is falling in pressure. In addition, the bed that is rising in pressure is also receiving feed gas simultaneously.

The basic features of the invention can be illustrated by describing the operation of a two bed VPSA process. However, it is anticipated that one or more than two beds could be employed using this invention. Now referring to FIGS. 3–5, the operation of the PSA process is disclosed over one cycle.

The VPSA process (see FIG. 4) described here consists of two beds 10 and 12 each filled with one or more layers (A & B) of adsorbents. An argon inlet conduit 14 provides compressed crude argon to feed valves 22 and 24, and bed inlets 26 and 28, respectively. A pair of exhaust valves 30 and 32 connect bed inlets 26 and 28 to conduit 34, which is coupled to an optional vacuum pump 36.

Figure 4:
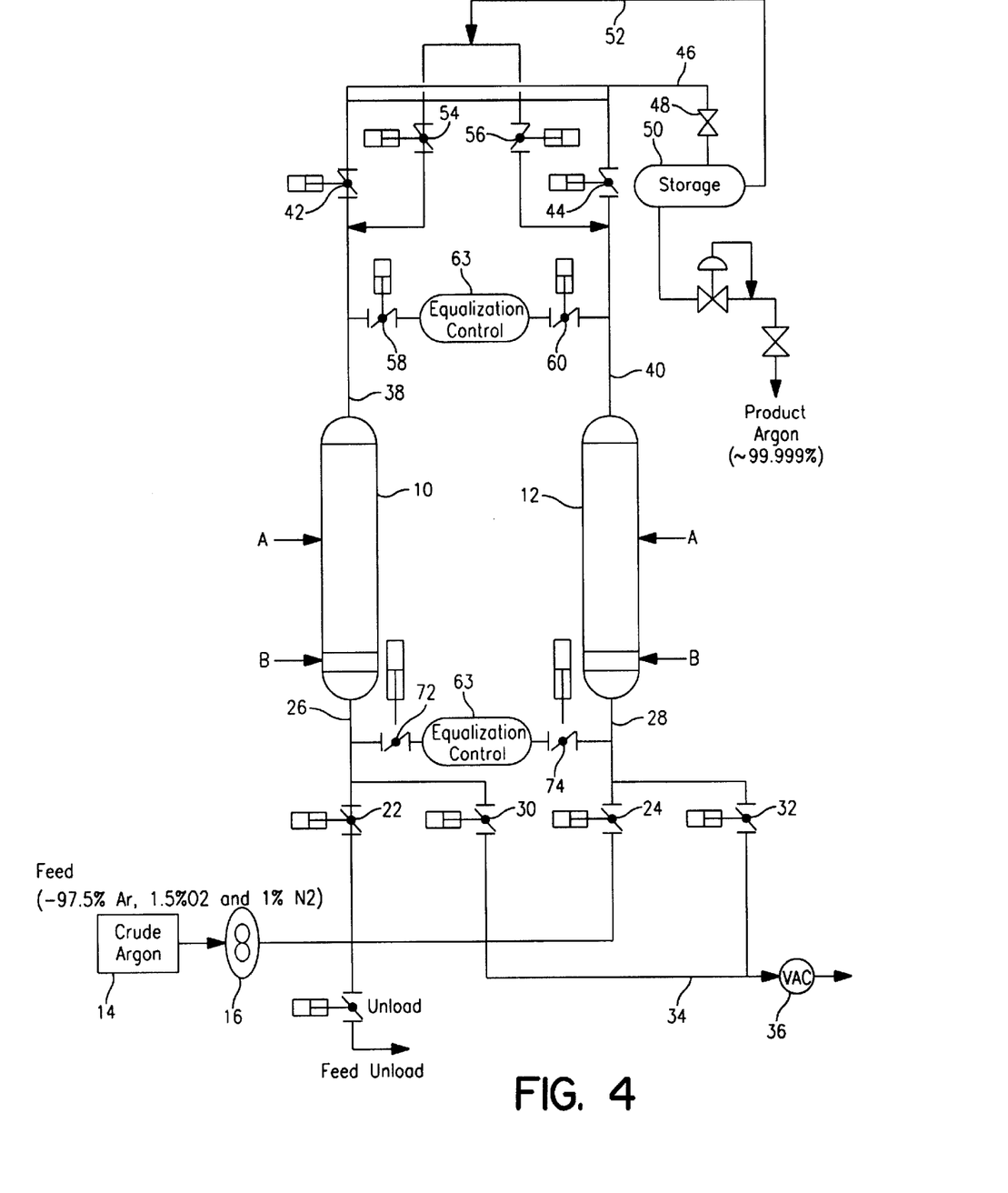
FIG. 4 illustrates a schematic of a two bed VPSA system and process of this invention.

Beds 10 and 12 include product outlet conduits 38 and 40 which communicate, via valves 42 and 44, to a product conduit 46, and through a control valve 48 to a product storage tank 50. Conduit 52 and valves 54 and 56 enable a feed of product gas from storage tank 50 to beds 10 and 12, respectively. Conduit 52 supplies any additional gas that is necessary for refluxing (e.g. purging and product pressurization).

Figure 5A:
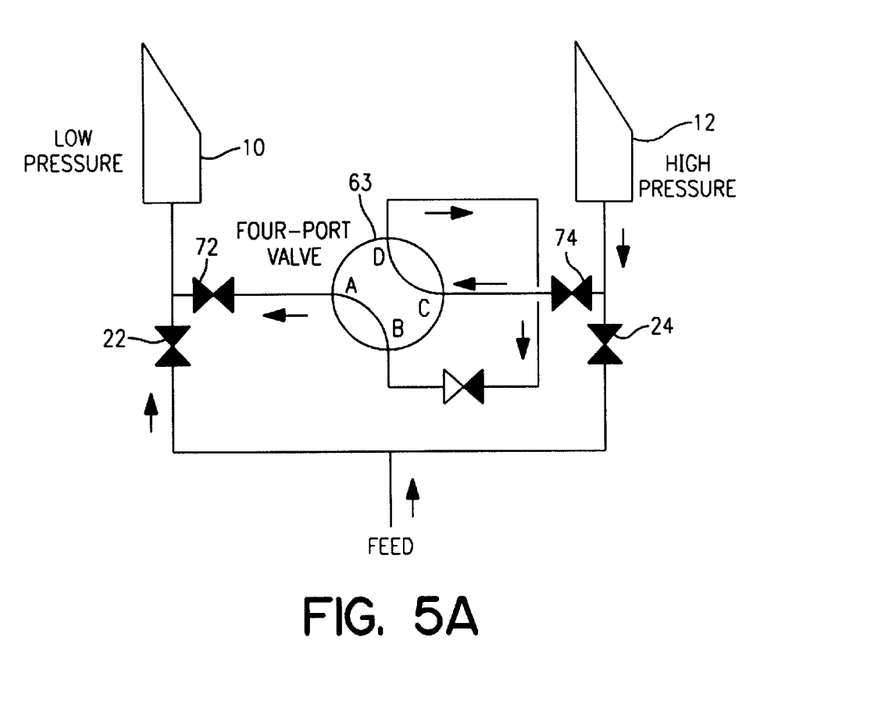
FIGS. 5 and 5A illustrate material flow path and valving arrangement for simultaneous bottom-to-bottom bed equalization.
Figure 5B:
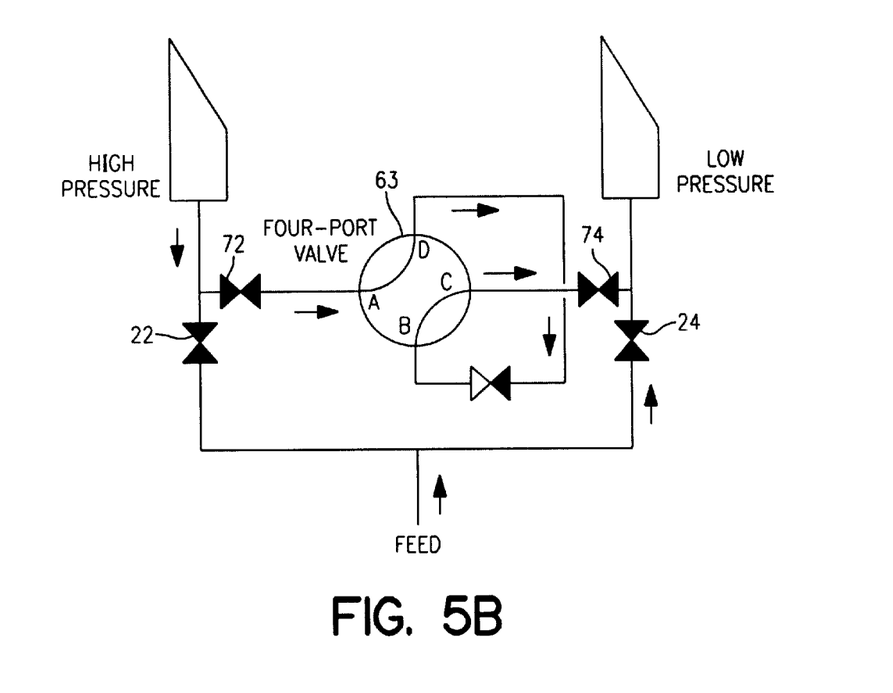

Outlet conduits 38 and 40 are further connected via valves 58 and 60, respectively, to allow gas obtained from a cocurrent depressurization step to enter an equalization control unit 62 (e.g. a four-port valve). Similarly, outlet conduits 26 and 28 are further connected via valves 72 and 74, respectively, to allow gas obtained from a countercurrent depressurization step to enter an equalization control unit 63. For example, FIG. 5A shows the operation of the control unit 63 (e.g. a four-port valve) during the bottom-bottom bed equalization step wherein bed 12 is undergoing the bottom-bottom bed equalization falling step, and bed 10 is undergoing the equalization rising step and feed pressurization simultaneously. In FIG. 5B, bed 10 and bed 12 have switched roles, i.e., bed 10 is now falling in pressure, and bed 12 is now receiving bottom-bottom bed equalization rising gas and feed gas simultaneously. Note that the check valve in FIGS. 5A and 5B allows only the bed that is rising in pressure to receive feed gas simultaneously.

All of the valves in FIGS. 4&5 are operated electronically via a computer system program logic (not shown). In the practice of this invention, the gas required for purging is first taken from another bed. However, if additional purge gas is required, then higher purity gas is taken from product storage tank 50, via conduit 52.

After the purge step is completed then another countercurrent evacuation is introduced prior to any pressurization (see FIG. 3). If void gas (e.g. Step 5, FIG. 3) is insufficient for the pressurization of another bed undergoing Step 10, then additional gas could be taken from the product storage tank 50 to achieve a desired target pressure. Alternatively, during Step 10 (FIG. 3), additional gas from the storage tank 50 could be used to reduce the time required to pressurize the bed to adsorption pressure.

Again referring to FIGS. 3–5, the two-bed VPSA process is now described to illustrate the opening and closing of the valves for each step of the cycle. In the description, all valves are assumed to be closed in each step of the cycle, unless explicitly declared to be in the opened position for that step.

Step 1: (FP): Feed in the form of crude Argon is introduced at one end of one bed. In the example, valve 22 (see FIG. 4) is opened to allow the feed gas to pressurize one bed 10. At the same time, valve 32 is opened and the second bed 12 undergoes evacuation. Some or all of the effluent from the evacuated bed 12 is recycled to the cryogenic process.

Step 2: (AD): Valves 22 and 32 remain open as in Step 1. In addition, valve 42 is opened. When the first bed 10 reaches the product delivery pressure, valve 48 is opened and controlled such that the bed pressure is held constant during the product delivery steps. Some of the product is held in the storage tank 50, and the remaining product passes through the storage tank 50 and is delivered to the customer. The second bed 12 is still undergoing evacuation during this time.

Step 3: (AD): Valves 22, 32, 42 and 48 are operating as described in Step 2. The first bed 10 is delivering product. Valves 58 and 60 are opened and product from the first bed 10 is introduced as purge to the second bed 12 using the equalization control circuit 62. A less preferred mode would be to open valve 56 and control it such that some of the gas from the storage tank 50 is introduced into the second bed 12 as purge.

Step 4: (AD): Valves 56, 58 and 60 are closed and the purge is discontinued. Valves 22, 32, 42 and 48 are operating as described in Step 2. The first bed 10 is delivering product. The second bed 12 is again undergoing evacuation.

Step 5: (EQ): In this step simultaneous top-to-top and bottom-to-bottom equalization with continuous feed is achieved as follows. Valves 22, 32, 42 and 48 are closed. The top-to-top equalization is achieved by opening valves 58 and 60. The flow control device 62 controls the quantity of gas passed from the high pressure bed 10 to the low pressure bed 12. Similarly, the bottom-to-bottom equalization is achieved by opening valves 72 and 74. Again, a flow control device 63 controls the quantity of gas passed from the high pressure bed 10 to the low pressure bed 12. Valve 24 is also opened and allows feed to enter the low pressure bed 12 during equalization.

Step 6: (EV): Valves 58, 60, 72 and 74 are closed. The first bed 10 is evacuated by opening valve 30. Pressurization of the second bed with feed continues as in Step 5 through valve 24. Some or all of the effluent from the evacuated bed 10 is recycled to the cryogenic process.

Step 7: (EV): Valves 24 and 30 remain open as in Step 6. The first bed 10 is still undergoing evacuation. In addition, valve 44 is opened. When the second bed 12 reaches the product delivery pressure, valve 48 is opened and controlled such that the bed pressure is held constant during the product delivery steps. Some of the product is held in the storage tank 50; this gas may be used as purge during the next step. The remaining product passes through the storage tank 50 and is delivered to the customer.

Step 8: (PG): Valves 24, 30, 44 and 48 are operating as described in Step 7. The second bed 12 is delivering product. Valves 58 and 60 are opened and product from the second bed 12 is introduced as purge to the first bed 10 using the equalization control circuit 62. A less preferred mode of operation would be to open valve 54 and control it such that some of the gas from the storage tank 50 is introduced into the first bed 10 as purge.

Step 9: (EV): Valves 54, 58 and 60 are closed and the purge is discontinued. Valves 24, 30, 44 and 48 are operating as described in Step 7. The first bed 10 is again undergoing evacuation. The second bed 12 is delivering product.

Step 10: (EQ): In this step simultaneous top-to-top and bottom-to-bottom equalization with continuous feed is achieved as follows. Valves 24, 30, 44 and 48 are closed. The top-to-top equalization is achieved by opening valves 58 and 60. The flow control device 62 controls the quantity of gas passed from the high pressure bed 12 to the low pressure bed 10. Similarly, the bottom-to-bottom equalization is achieved by opening valves 72 and 74. Again, a flow control device 63 controls the quantity of gas passed from the high pressure bed 12 to the low pressure bed 10. Valve 22 is also opened and allows feed to enter the low pressure bed 10 during equalization.

FIGS. 5A and 5B show the case for simultaneous feed and bottom-to-bottom bed equalization. For clarity, only the bottom equalization circuit with the simultaneous feed step is shown. However, with minor modification to FIGS. 5A and 5B, a similar configuration could be applied to the top-to-top bed equalization circuit. As shown in FIGS. 5A and 5B, a four-port valve is used to maintain the proper flow path through the check valve. However, this circuit can also contain other directional dependent devices, such as for example, a regulating valve, an orifice plate, or mass flow controller. As shown in FIG. 5A and consistent with the process descriptions given in Steps 5 and 10 above, gas from the high pressure bed (B) is passed through valve 74, then through the four-port valve 63 in the order C-D-B-A and then through valve 72. The four-port valve is oriented such that the directional flow control device(s) are aligned properly. In this case, the continuous feed is introduced into the low pressure bed (A) through valve 22. FIG. 5B shows the flow direction reversed. Gas from the high pressure bed (A) flows through valve 72, then through the four-port valve 63 in the order A-D-B-C and then through valve 74. At the same time, the continuous feed is introduced into the low pressure bed (B) through valve 24. In this manner the flow direction is properly maintained using a single circuit.

Tables 1 and 2 hereinafter give examples of the operating conditions and the VPSA process performance using oxygen rate selective (e.g. carbon molecular sieve: CMS), and oxygen equilibrium selective (e.g. IC2) adsorbents, respectively. In the tables, the symbols have the following meaning: TPD=ton (2000 lb) per day of argon, kPa 1000 Pa=S.I. unit for pressure (1.0 atm.=101.325 kPa), s=time unit in seconds, kW=kilowatt. Also, in Table 2, the compound designated IC2, typically abbreviated as Co{3,5-diBu$^t$sal/(EtO)(CO$_2$Et)Hmal-DAP}, is the cobalt (II) complex of the dianion of a chelating ligand prepared formally by the 1:1 condensation of ethoxy-methylene-diethylmalonate and 3,4-diamino-pyridine, followed by Schiff base condensation of the remaining primary amine group with 3,5-di-tert-butysalicylaldehyde.

TABLE 1

An example using a single layer of the O$_2$ rate selective adsorbent, e.g. carbon molecular sieve (CMS) in the two-bed PSA process depicted in FIGS. 3–5. The results shown below were obtained from PSA simulation, and was confirmed experimentally using a laboratory scale PSA process.

| Adsorbent: | Carbon molecular sieve (CMS) |
|---|---|
| Cycle Time (s): | 88 |
| Feed Composition: | 98.5% Ar and 1.5% O$_2$ |
| High Pressure: | 240 kPa |
| Low Pressure: | 28 kPa |
| Feed Rate: | 9.0975 × 10$^3$ NCFH |
| Argon Purity: | 99.9998% |
| Argon Recovery: | 40% |
| Bed Size Factor: | 1050 lb/TPD |
| Temp(K.): | 300 |

TABLE 2

An example using a single layer of the O$_2$ equilibrium selective adsorbent, e.g., IC2 in a two-bed PSA process. The results shown below were obtained from PSA simulations.

| Adsorbent: | IC2 |
|---|---|
| Cycle Time (s): | 28 |
| Feed Composition: | 98.5% Ar and 1.5% O2 |
| High Pressure: | 240 kPa |
| Low Pressure: | 28 kPa |
| Feed Rate: | 2.15 × 10$^5$ NCFH |
| Argon Purity: | 99.9998% |
| Argon Recovery: | 67.12% |
| Bed Size Factor: | 7.1 lb/TPD |
| Power: | 1.46 kW/TPD |
| Temp(K.): | 300 |

Note from Tables 1 and 2 the Ar recoveries and bed size factors for the two-bed PSA process using O$_2$ rate selective and O$_2$ equilibrium selective adsorbents, respectively. In using O$_2$ equilibrium selective adsorbent instead of CMS, enhanced Ar recovery (67 vs 40% for CMS), and significant reduction in bed size factor (7.1 vs 1050 lb/TPD for CMS) are observed.

The equalization control circuits 62 and 63, shown in FIG. 4, can take many forms. It may be necessary to include check valves in these circuits. In this case each equalization control device might consist of two parallel circuits each containing a check valve and a flow control device for example a regulating valve or metering valve, an orifice plate, a mass flow controller. As shown in FIGS. 5A and 5B, a four-port valve 63 is used to maintain the proper flow path through the check valve. This circuit can also contain other directional dependent devices, for example a regulating valve, an orifice plate, or mass flow controller.

Based on the VPSA cycle described above in relation to FIGS. 3–5, several modifications can be made to alter one or more of the steps without deviating from the application or the general features of the invention. For example, the feed and bottom-to-bottom bed equalization steps can occur simultaneously as described above or as discrete steps in the VPSA cycle. Also, if the low pressure level in the cycle is less than 1.0 atm, i.e., the PSA cycle utilized a vacuum pump for evacuation, then the countercurrent depressurization step can be preceded by recycling the first portion of the countercurrent blowdown gas to the cryogenic process, then as the heavy component starts to desorb in subsequent evacuation step(s), all or some of the additional desorbed gas could either be recycled to the rectification column of the cryogenic plant or vented as waste, or sent to an air blower housing of a cryogenic plant. Also, unlike most prior art PSA processes, the cycle of this invention allows the use of continuous feed during the bed equalization step(s).

In addition, in the preferred mode of operation, only two adsorbent beds are required to process a continuous feed. Also, the use of the evacuation steps before and after the purge step is necessary in achieving higher productivity and higher purity product. Another mode of operation includes the use of product gas from the storage tank 50 for pressurization. The product pressurization could be done during the simultaneous top-to-top and bottom-to-bottom equalization step (Bed A: step 10 of FIG. 3) or as a separate step after the bed-to-bed equalization step. Also, as described above, the simultaneous feed and bed equalization steps could be discrete steps. For example, the feed step follows the equalization step. However, in the preferred mode of operation, during the equalization step, the bed that is rising in pressure is also receiving feed simultaneously (see FIGS. 3 and 5). Also, the simultaneous top-to-top and bottom-to-bottom bed equalization steps could be divided into discrete steps, or as discrete steps followed by simultaneous steps. For example, top-to-top bed equalization step could begin first, then followed by the simultaneous top-to-top and bottom-to-bottom equalization step.

In addition, in applying the VPSA cycle of this invention, more than one layer of adsorbents could be used to purify the crude argon stream. For example, if the crude argon stream from the cryogenic plant contains $N_2$ and $O_2$, then two or more layers of adsorbents for $N_2$ and $O_2$ removal could be used wherein the adsorbent for $N_2$ removal is placed near the feed end of the bed, and the adsorbent for $O_2$ removal is placed near the product end of the bed or vice versa. For example, using FIG. 4, adsorbent A could be the $O_2$ selective adsorbent, and adsorbent B the $N_2$ selective adsorbent. In addition, adsorbents A & B could be mixed together and placed in a single layer in each bed.

Other important features of the invention include the choice of operating conditions of the PSA process for example, high pressure, low pressure, pressure at the end of the cocurrent depressurization step, etc., the times allocated for each step of the PSA cycle, the order in which each step of the cycle is executed, the purity of the refluxing gas for purging and product pressurization, and the amount of gas used for purging and product pressurization.

An alternative way of operating the two-bed VPSA cycle (see FIGS. 3–5), is to run the process using additional storage tanks to capture gas during the bed equalization step(s) thereby removing the need for bed synchronization. Also, the process could also operate in a mode where all of the purging gas comes from the storage tank 50. In addition, using multiple storage tanks allow for greater flexibility in the process. For example, the individual steps in the cycle shown in FIG. 3 do not have to occupy fixed periods of time. Thus, physical variables such as pressure and composition can be used easily to determine the time allocated for each step thereby adjusting the process for changes in temperature, pressure and variable product demand. Since no bed-to-bed gas transfer is required when additional storage tanks are used, then it is possible to run each bed independently, and regard the process as a collection of single bed units. However, for proper sizing and sharing of compressor(s) and vacuum pump(s), some synchronization of the overall cycle of each bed with the cycles of the other beds is necessary.

Although the invention described here makes use of cylindrical adsorbent beds with shallow dished heads on the top and bottom, and gas flow in the axial direction, other bed configurations may be used. For example, radial beds may be used to achieve a reduction in pressure losses with a concomitant reduction in power consumption. In addition, beds of different adsorbents can be placed in series instead of in layers within a single bed when two or more adsorbents are used in the PSA process. In addition, other $O_2$ rate selective adsorbents such as clinoptilolite, mordenite, and 4A zeolite, or an equilibrium selective adsorbent for example IC2 (a transition element complex or "TEC") could be used for the argon-oxygen separation by VPSA. Other preferred TEC's include $Co\{(Me_2Ac_2H_2malen\}(4-PyOLi);$ $Co\{Me_2Ac_2H_2maltmen\}(4-PyOLi);$ and $Co\{Me_2Ac_2H_2maldmen\}(4-PyOLi).$ These TECs are described in co-pending, commonly assigned U.S. patent applications Ser. No. 09/225,052 (Stephenson et al), Ser. No. 09/458,066 (Zhang et al), and in Ser. No. 09/725,845 (Zhang et al).

Although only a few modifications of the VPSA process are mentioned, other modifications of the PSA process can be easily obtained without deviating from the basic features of the invention.

In addition, the VPSA cycle has been described in relation to argon purification, wherein particular embodiments have been shown, other embodiments are contemplated along with modification of the disclosed features as being within the scope of the invention. For example, the PSA cycle is not restricted to trians-atmospheric vacuum pressure swing adsorption (VPSA) cycles, and super atmospheric or subatmospheric PSA cycles may also be used. In addition, the PSA process of this invention could also be used for separating other mixtures.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A method for purifying, in a two bed pressure swing adsorption column cycle, a pressurized crude feed gas containing a non-preferentially adsorbable first gas and minor amounts of one or more selectively adsorbable second gas(es) and the method comprising the steps of:

(1) providing a first and a second bed, each bed housing adsorbent(s) for the second gas(es);

(2) introducing crude feed gas into a first end of the first bed to pressurize said bed, and evacuating the second bed from a first end thereof;

(3) adsorbing second gas(es) from the crude feed gas in the pressurized first bed to produce product gas of purified first gas, and delivering product gas from a second end of the first bed to a product gas storage container;

(4) introducing product gas to a second end of the second bed to purge the second bed from the first end thereof;

(5) after completion of the purge of the second bed, evacuating the second bed from the first end thereof;

(6) discontinuing the evacuation of the second bed, terminating delivery of product gas from the first bed to the product gas storage container, and simultaneously equalizing pressure in the first and second beds at the first and second ends thereof in first-to-first end and second-to-second end equalizations thereby lowering the pressure in the first bed and raising the pressure in the second bed while introducing crude argon feed into the first end of the second bed;

(7) terminating the pressure equalization of step (6) and evacuating the first bed from the first end thereof;

(8) adsorbing second gas(es) from the crude feed gas in the pressurized second bed to produce product gas of purified first gas, and delivering such product gas from the second end of the second bed to the product gas storage container;

(9) introducing product gas to the second end of the first bed to purge the first bed from the first end thereof;

(10) after completion of the purge of the first bed, evacuating the first bed from the first end thereof; and (11) discontinuing the evacuation of the first bed, terminating delivery of product gas from the second bed to the product gas storage container, and simultaneously equalizing pressure on the first and second beds at the first and second ends thereof in first-to-first end and second-to-second end equalizations thereby lowering the pressure in the second bed and raising the pressure in the first bed while introducing crude argon feed into the first end of the first bed.

2. The process of claim 1, wherein the product gas introduced into the second end of the second bed in step (4) and the product gas introduced into the second end of the first bed in step (9) comprises, at least in part, product gas from the product gas storage container.

3. The process of claim 1, wherein the product gas introduced into the second end of the second bed in step (4) comprises product gas from the second end of the first bed, and the product gas introduced into the second end of the first bed in step (9) comprises product gas from the second end of the second bed.

4. The process of claim 1, which is continuous and after step (11), the process continues to cycle through steps (2) to (11).

5. In a pressure swing process for purifying a pressurized crude feed gas containing a non-preferentially adsorbable first gas and minor amounts of one or more selectively adsorbable second gas(es), the improvement comprising utilizing two beds, each housing adsorbent(s) for the second gas(es) and continuously providing a feed of the crude feed gas to either of the two beds during the process, and performing a simultaneous equalization of pressure in the two beds at first and second ends of the two beds in a first-to-first end and second-to-second end equalization in each bed following purging of each bed.

6. The process of claim 5, wherein a four-port valve is used in order to prevent said crude feed gas from entering into that bed which is being lowered in pressure during said simultaneous equalization of pressure in said two beds.

7. A method for purifying, in a two bed pressure swing adsorption column cycle, a pressurized crude argon feed containing argon and minor amounts of oxygen and nitrogen, the method comprising the steps of:

(1) providing a first and a second bed, each bed housing oxygen and nitrogen adsorbents;

(2) introducing crude argon feed into a first end of the first bed to pressurize said bed, and evacuating the second bed from a first end thereof;

(3) adsorbing oxygen and nitrogen from the crude argon feed in the pressurized first bed to produce product gas of purified argon, and delivering product gas from a second end of the first bed to a product gas storage container;

(4) introducing product gas to a second end of the second bed to purge the second bed from the first end thereof;

(5) after completion of the purge of the second bed, evacuating the second bed from the first end thereof;

(6) discontinuing the evacuation of the second bed, terminating delivery of product gas from the first bed to the product gas storage container, and simultaneously equalizing pressure in the first and second beds at the first and second ends thereof in first-to-first end and second-to-second end equalizations thereby lowering the pressure in the first bed and raising the pressure in the second bed while introducing crude argon feed into the first end of the second bed;

(7) terminating the pressure equalization of step (6) and evacuating the first bed from the first end thereof;

(8) adsorbing oxygen and nitrogen from the crude argon feed in the pressurized second bed to produce product gas of purified argon, and delivering such product gas from the second end of the second bed to the product gas storage container;

(9) introducing product gas to the second end of the first bed to purge the first bed from the first end thereof;

(10) after completion of the purge of the first bed, evacuating the first bed from the first end thereof; and (11) discontinuing the evacuation of the first bed, terminating delivery of product gas from the second bed to the product gas storage container, and simultaneously equalizing pressure on the first and second beds at the first and second ends thereof in first-to-first end and second-to-second end equalizations thereby lowering the pressure in the second bed and raising the pressure in the first bed while introducing crude argon feed into the first end of the first bed.

8. The process of claim 7, wherein the product gas introduced into the second end of the second bed in step (4) and the product gas introduced into the second end of the first bed in step (9) comprises, at least in part, product gas from the product gas storage container.

9. The process of claim 7, wherein the product gas introduced into the second end of the second bed in step (4) comprises product gas from the second end of the first bed, and the product gas introduced into the second end of the first bed in step (9) comprises product gas from the second end of the second bed.

10. The process of claim 7, which is continuous and after step (11) the process continues to cycle through steps (2) to (11).

11. The process according to claim 7, wherein the crude argon feed comprises about 97.5% argon, about 1.5% oxygen and about 1% nitrogen.

12. The process according to claim 7, wherein the product gas comprises >99.999% argon.

13. The process of claim 7, wherein the oxygen adsorbent comprises an adsorbent selected from a carbon molecular sieve, Co$\{3,5$-diBu$^t$sal/(EtO)(CO$_2$Et)Hmal-DAP$\}$, Co$\{$(Me$_2$Ac$_2$H$_2$malen$\}$(4-PyOLi); Co$\{$Me$_2$Ac$_2$H$_2$maltmen$\}$(4-PyOLi), Co$\{$Me$_2$H$_2$H$_2$malophen$\}$, Co$\{$Me$_2$Ac$_2$H$_2$malen$\}$(4-PyOLi)(MeOH), Co$\{$Me$_2$Ac$_2$H$_2$maltmen$\}$(4-PyOLi), clinoptilolite, mordenite and 4A zeolite, and the nitrogen adsorbent comprises a zeolite.

14. In a pressure swing process for purifying a pressurized crude argon feed containing argon and minor amounts of oxygen and nitrogen, the improvement comprising utilizing two beds, each housing oxygen and nitrogen adsorbents and continuously providing a feed of the crude argon feed to either of the two beds during the process, and performing a simultaneous equalization of pressure in the two beds at first and second ends of the two beds in a first-to-first end and second-to-second end equalization in each bed following purging of each bed.

15. A system for purifying, in a two bed pressure swing adsorption column cycle, a pressurized crude feed gas comprising a non-preferentially adsorbable first gas and minor amounts of one or more selectively adsorbable second gas(es), the system comprising:
- (1) first and second beds for housing adsorbent(s);
- (2) feed means for supplying a stream of crude feed gas to first ends of the first and second beds;
- (3) means for permitting and prohibiting supply of the stream of crude feed gas to the first ends of the first and second beds;
- (4) means for permitting and prohibiting evacuating the first and second beds;
- (5) means for permitting or prohibiting purging the first and second beds;
- (6) first pressure equalization control means for permitting or prohibiting pressure equalization between the first ends of the first and second beds;
- (7) a product gas storage container;
- (8) means for permitting and prohibiting delivery of product gas from second ends of the first and second beds to the product gas storage container; and
- (9) second pressure equalization control means for permitting and prohibiting pressure equalization between the second ends of the first and second beds.

16. The system of claim 15, wherein said means for permitting and prohibiting supply of the stream of crude feed gas to the first ends of the first and second beds comprise a four-port valve.

17. The system of claim 15 additionally comprising means for permitting and prohibiting return of product gas from the product gas storage container to the second ends of the first and second beds.

18. A system for purifying, in a two bed pressure swing adsorption column cycle, a pressurized crude argon feed comprising argon and minor amounts of oxygen and nitrogen, the system comprising:
- (1) first and second beds for housing oxygen and nitrogen adsorbents;
- (2) feed means for supplying a stream of crude argon feed to first ends of the first and second beds;
- (3) means for permitting and prohibiting supply of the stream of crude argon to the first ends of the first and second beds;
- (4) means for permitting and prohibiting evacuating the first and second beds;
- (5) means for permitting or prohibiting purging the first and second beds;
- (6) first pressure equalization control means for permitting or prohibiting pressure equalization between the first ends of the first and second beds;
- (7) a product gas storage container;
- (8) means for permitting and prohibiting delivery of product gas from second ends of the first and second beds to the product gas storage container; and
- (9) second pressure equalization control means for permitting and prohibiting pressure equalization between the second ends of the first and second beds.

19. The system of claim 18 additionally comprising means for permitting and prohibiting return of product gas from the product gas storage container to the second ends of the first and second beds.

* * * * *